United States Patent
Ganapathiappan

(10) Patent No.: US 8,314,163 B2
(45) Date of Patent: Nov. 20, 2012

(54) STERIC STABILIZED LATEX PARTICULATES

(75) Inventor: Sivapackia Ganapathiappan, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 247 days.

(21) Appl. No.: 12/741,546

(22) PCT Filed: Nov. 30, 2007

(86) PCT No.: PCT/US2007/024707
§ 371 (c)(1),
(2), (4) Date: May 5, 2010

(87) PCT Pub. No.: WO2009/070147
PCT Pub. Date: Jun. 4, 2009

(65) Prior Publication Data
US 2011/0097497 A1    Apr. 28, 2011

(51) Int. Cl.
*C09D 11/00*    (2006.01)
(52) U.S. Cl. ........ 523/160; 523/161; 427/256; 528/271; 524/599
(58) Field of Classification Search .................. 523/160, 523/161
See application file for complete search history.

(56) References Cited

U.S. PATENT DOCUMENTS

| 3,755,234 | A | 8/1973 | Chujo |
| 3,984,361 | A | 10/1976 | Gugliemelli |
| 4,002,589 | A | 1/1977 | Farley |
| 5,527,618 | A | 6/1996 | Graiver |
| 6,143,817 | A | 11/2000 | Hallam |
| 6,235,813 | B1 | 5/2001 | Brandt |
| 2004/0110891 | A1 | 6/2004 | Guo |
| 2007/0216742 | A1* | 9/2007 | Sarkisian et al. ............. 347/100 |

FOREIGN PATENT DOCUMENTS

| EP | 0098263 | 11/1983 |
| EP | 0072735 | 4/1985 |
| JP | 2003-268160 | 9/2003 |
| WO | WO-0240558 | 5/2002 |
| WO | 2007-109534 | 9/2007 |

OTHER PUBLICATIONS

Tuncel, A. et al. "Emulsion copolymerization of styrene and methacrylic acid in the presence of a polyethylene oxide based-polymerizable stabilizer with a shorter chain length", Colloid and Polymer Science, 279(3), pp. 240-251. Mar. 31, 200 I.

Bucsi, A. et al. "Monodisperse polystyrene latex particles functionalized by the macromonomer technique", Macromolecules, 31 (7), pp. 2087-2097. Apr. 7, 1998.

* cited by examiner

*Primary Examiner* — Doris Lee

(57) ABSTRACT

The present invention is drawn to steric stabilized latex particulates, methods of forming such particulates, inks containing such particulates, and methods of ink-jetting inks containing such particulates. A steric stabilized latex particulate for use in an ink-jet ink can comprise a random copolymer of a steric stabilization oligomer and a hydrophobic monomer.

25 Claims, No Drawings

STERIC STABILIZED LATEX PARTICULATES

BACKGROUND

There are several reasons that ink-jet printing has become a popular way of recording images on various media Surfaces, particularly paper and photo media substrates. Some of these reasons include low printer noise, capability of high-speed recording, and capability of multi-color recording. Additionally, these advantages can be obtained at a relatively low price to consumers. With respect to ink-jet ink chemistry, the majority of commercial ink-jet inks are water-based. Thus, their constituents are generally water-soluble, as in the case with many dyes, or water dispersible, as in the case with pigments. Furthermore, ink-jet inks often have low viscosity to accommodate high frequency jetting and firing chamber refill processes common to ink-jet architecture.

Attempts to improve ink characteristics such as durability, fade-resistance, shelf-life, drop placement, resolution, viscosity, etc., have included the addition of additives to the ink such as biocides, buffers, latexes, dispersants, inorganic pigments, chelating agents, etc. Continuing in this, it would be desirable to provide methods, inks, and systems that provide improved ink performance.

DETAILED DESCRIPTION

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

As used herein, "liquid vehicle" or "liquid medium" refers to the fluid in which the steric stabilized latex particulates of the present invention can be dispersed to form a latex suspension. Often, the latex suspension can further include a colorant that can be used as an ink-jet ink. Many liquid vehicles and vehicle components are known in the art. Typical liquid vehicles can include a mixture of a variety of different agents, such as surfactants, co-solvents, buffers, biocides, sequestering agents, viscosity modifiers, water, etc. Additionally, the terms "aqueous liquid vehicle" or "aqueous vehicle" refer to liquid vehicles that contain water as a major solvent. Such vehicles may also contain additional organic co-solvents as is known in the art.

As used herein, "colorant" can include dyes and/or pigments.

As used herein, "pigment" generally includes pigment colorants, magnetic particles, aluminas, silicas, and/or other ceramics or organo-metallics, whether or not such particulates impart color. Pigments can be dispersed in a liquid vehicle with a separate dispersing agent, or can have dispersing agent attached to its surface, e.g., small molecule or polymeric dispersing agents. Such pigments are well-known in the art.

As used herein, "dye" refers to compounds or molecules that impart color to a vehicle or compound incorporating the dye. As such, dye includes molecules and compounds that absorb electromagnetic radiation or certain wavelengths thereof. For example, dyes include those that fluoresce or those that absorb certain wavelengths of visible light. Generally, dyes are water soluble. Such dyes are well-known in the art.

As used herein, "steric stabilized oligomer," "steric stabilization oligomer," "stabilized oligomer," "stabilization oligomer," or the like, refers to an oligomer having a stabilization group incorporate therein. Such oligomers are generally reacted with a cerium initiator to form reactive stabilization oligomers that can be subsequently incorporated into steric stabilized latex particulates. Stabilization oligomers have at least 2 polymerized monomeric units having a stabilization group and may also contain other hydrophilic and hydrophobic monomers. Generally, such stabilization oligomers are hydrophilic.

As used herein, "stabilization group" refers to hydrophilic groups capable of stabilizing a polymer or oligomer in water without the use of an ionic charge. Such stabilization groups include polyethylene oxide, polypropylene oxide, polymethylene oxide, poly(ethylene oxide-co-methylene oxide), substitutions thereof and derivatives thereof. Such stabilization groups can be incorporated into the steric stabilized latex particulates, described herein, through the polymerization of reactive stabilization oligomers.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

It has been recognized that it would be advantageous to develop steric stabilized latex particulates suitable for development over a wide variety of applications. In accordance with this, the present invention is drawn to compositions and methods having a steric stabilized latex particulate for use in an ink-jet ink. It is noted that when discussing a steric stabilized latex particulate or a method of formulating such a latex particulate, each of these discussions can be considered applicable to each of these embodiments, whether or not they are explicitly discussed in the context of that embodiment. Thus, for example, in discussing the steric stabilization oligomer present in the steric stabilized latex particulate, those steric stabilization oligomers can also be used in a method for making such steric stabilized latex particulates, and vice versa.

As such, with these definitions in mind, a steric stabilized latex particulate, in accordance with embodiments of the present invention, can comprise a random copolymer of a steric stabilization oligomer and a hydrophobic monomer. For example, in one embodiment, an oligomer chain (not merely its individual monomers) can be randomly copolymerized with a hydrophobic monomer.

In another embodiment, a method of forming a steric stabilized latex particulate for use in an ink-jet ink can comprise the steps of reacting a cerium initiator with a steric stabilized oligomer to form reactive steric stabilization oligomers, and polymerizing a hydrophobic monomer and the reactive steric stabilization oligomers in water to form the steric stabilized latex particulate. Additionally, an ink-jet ink can comprise a vehicle, a colorant, and a steric stabilized latex particulate as described herein. In one embodiment, a method of ink-jet printing can comprise ink-jetting an ink-jet ink as described herein.

The formation of a steric stabilized latex particulate in accordance with the above embodiments provides several advantages. For example, steric stabilized latex particulates can increase the film stability of the ink while maintaining the $T_g$ of the polymer. The present steric stabilized latex particulates can also improve the durability of the ink and resulting prints when ink-jetted. Additionally, these steric stabilized latex particulates can allow more flexible ink formulation since they do not necessarily require specific pH ranges and do not necessarily affect the resulting ionic strength of the vehicle or ink.

The latex particulates of the present invention can be prepared through conventional free radical addition of a monomer mixture through emulsion polymerization. As previously discussed, the steric stabilized latex particulates described herein include steric stabilized oligomers, hydrophobic monomers, and/or hydrophilic monomers. Steric stabilized oligomers generally include at least two monomers having steric stabilization groups. However, the oligomers may also include other hydrophilic and hydrophobic monomers. As such, when discussing hydrophobic and hydrophilic monomers, such a discussion can refer to those used in the polymerization with the steric stabilization oligomers or those monomers that have been incorporated into such oligomers. However, it is noted that an oligomer chain is what is ultimately copolymerized with other hydrophobic monomers. For example, a steric stabilized oligomer may contain at least two units of ethylene oxide and one monomer unit of methacrylate. Such an oligomer can be polymerized with methacrylate and styrene to form a steric stabilized latex particulate. As such, it is recognized that the methacrylate can be properly referred to as a hydrophobic monomer that is part of the steric stabilized oligomer and a hydrophobic monomer that is polymerized with the oligomer to form a steric stabilized latex particulate. Therefore, hydrophobic and hydrophilic monomers, as described herein, can be used in the steric stabilized oligomers and/or the steric stabilized latex particulates described herein.

In one embodiment, the steric stabilization oligomer can be selected from the group consisting of: polymethylene oxide, substituted polymethylene oxide, polyethylene oxide, substituted polyethylene oxide, polypropylene oxide, substituted polypropylene oxide, acrylates thereof, and combinations thereof. In another embodiment, the steric stabilization oligomer can be selected from the group consisting of: methoxy ethanol; methoxy ethoxy ethanol; methoxy polyethylene glycol (e.g., molecular weight 350, 550, 750, 1000, 2000 or 5000); polyethylene glycol (e.g., molecular weight from 100 to 10000); 1-methoxy-2-propanol; 3-methoxy-1,2-propanediol; poly(ethylene glycol-co-propylene glycol) (e.g., molecular weight 100 to 5000); polyethylene glycol (e.g., molecular weight from 100 to 5000 with end groups of amino, acid, alkyl, and acrylate including further substitutions thereof); ethylene glycol monomethacrylate (e.g., with ethylene oxide units from 1 to 100); and combinations thereof. Additionally, the steric stabilization oligomer can contain hydrophobic monomers.

Suitable hydrophobic monomers include styrene, p-methyl styrene, methyl methacrylate, hexyl acrylate, hexyl methacrylate, butyl acrylate, butyl methacrylate, ethyl acrylate, hydroxyethyl acrylate, ethyl methacrylate, hydroxyethyl methacrylate, propyl acrylate, hydroxypropyl acrylate, propyl methacrylate, hydroxypropyl methacrylate, vinylbenzyl chloride, ethylhexyl acrylate, ethylhexyl methacrylate, isobutyl acrylate, isobutyl methacrylate, cyclohexyl methacrylate, stearyl methacrylate, alpha-methylstyrene, vinyl acetate, vinyl benzoate, and, vinyl ethers such as vinyl methyl ether, vinyl phenyl ether, vinyl butyl ether, allyl ether, maleimide derivatives such as N-phenyl maleimide and N-methyl maleimide, and combinations thereof.

In one embodiment, the steric stabilized latex particulates can be polymerized from a reactive steric stabilized oligomer and a hydrophobic monomer. In another embodiment, the steric stabilized latex particulates can be polymerized from a reactive steric stabilized oligomer, a first hydrophobic monomer, and a second hydrophobic monomer. In yet another embodiment, the steric stabilized latex particulates can be polymerized from a reactive steric stabilized oligomer, a first hydrophobic monomer, a second hydrophobic monomer, and a hydrophilic monomer. Such first and second hydrophobic monomers can be the same or different. Additionally, a third hydrophobic monomer can be further included in the polymerizations described herein.

Hydrophilic monomers described herein can include ethylene oxide, propylene oxide, methylene oxide, substitutions thereof, and combinations thereof. Additionally, hydrophilic monomers can include oligomers such as, methoxy ethanol; methoxy ethoxy ethanol; methoxy polyethylene glycol (e.g., molecular weight 350, 550, 750, 1000, 2000 or 5000); polyethylene glycols (e.g., molecular weight from 100 to 10000); 1-methoxy-2-propanol; 3-methoxy-1,2-propanediol; poly (ethylene glycol-co-propylene glycol) (e.g., molecular weight 100 to 5000); polyethylene glycol (e.g., molecular weight from 100 to 5,000 with end groups of amino, acid, alkyl, and acrylate including further substitutions thereof); ethylene glycol monomethacrylate (e.g., with ethylene oxide units from 1 to 100); and combinations thereof.

As previously discussed, the steric stabilization oligomers have at least two monomers having a stabilization group(s). In one embodiment, the steric stabilization oligomer has from about 2 to 1000 polymerized monomer units. In another embodiment, the steric stabilization oligomer has from about 2 to 100 polymerized monomer units. In still another embodiment, the steric stabilization oligomer has from about 10 to 50 polymerized monomer units.

The methods and compositions described herein generally use a cerium compound as a free radical initiator for subsequent polymerization of a monomer/oligomer emulsion mixture to form the steric stabilized latex particulates. The cerium initiator can be any compound containing cerium that is capable of forming a radical on a steric stabilization group containing oligomer. In one embodiment, the cerium initiator can be a member selected from the group consisting of ammonium cerium (IV) nitrate, ammonium cerium (IV) sulfate and combinations thereof. In another embodiment, the cerium initiator can be ammonium cerium (IV) nitrate. Generally, the cerium initiator can initiate a free radical polymerization by forming a radical on a stabilization group of the steric stabilized oligomer thereby forming a reactive steric stabilized oligomer. Such a reactive stabilized oligomer can then initiate polymerization with other hydrophobic and/or hydrophilic monomers to form a steric stabilized latex particulate. As such, with the use of cerium initiators, the polymerization can incorporate hydrophobic monomers and hydrophilic monomers. In these compounds, cerium can be replaced with other metals such as actinium, lanthanum, yttrium, scandium, and thorium.

An aqueous emulsion of hydrophobic monomers, hydrophilic monomers, and/or steric stabilization oligomers can be prepared using emulsion polymerization synthesis. The thickness of the steric stabilized latex particulates can be any suitable thickness, but is typically greater than 50 nm to allow adequate film formation to occur on a media substrate upon printing. Typically, the selected steric stabilized latex particulate can be sized below 350 nm. In one embodiment, the steric stabilized latex particulate diameter can be from about 100 to 300 nm, though diameters outside of this range may be appropriate as well for certain applications.

The latex can also be a dispersion stabilized through incorporation of a monomer or monomers that promote latex surface charge. For example, such charge forming monomers include acrylic acid, methacrylic acid, vinyl benzoic acid, and methacryloyloxyethylsuccinate. The charge forming monomers typically comprise from 0.5 wt % to 20 wt %, preferably 3 wt % to 10 wt %, of the monomer mix by weight and are typically neutralized after latex polymerization to form salts. Such salts may be formed through the reaction of a monomer carboxylic acid with potassium hydroxide or other similar salting agent. As such, incorporation of acid moities can further improve stability to latex particles.

Particle dispersion stability is also influenced by particle density, which influences the ability of particles to settle within ink-jet architecture microchannels. In the present invention, the monomer/oligomer mixture can be selected to collectively produce latex particles having a density of 0.995-1.10 g/cm$^3$, preferably from about 1.03-1.05 g/cm$^3$. In most instances, the liquid vehicle of aqueous ink jet inks has a density on the order of 1.01-1.02 g/cm$^3$, though this is not required.

Other materials, such as surfactants, can generally also be used to control the latex particle size during polymerization and can also be selected to provide additional particle dispersion stability. Such surfactants are often adhered to the particle surface to minimize thermal stripping under thermal architecture firing conditions.

Additionally, the surface dielectric constant of the steric stabilized latex particulates of the present invention can be from 2.0 to 3.0, and can be below 2.8 in one embodiment. This property can be useful to sufficiently anchor surfactants against thermal shear stripping in thermal ink-jet architecture. Stabilization can also be facilitated by the incorporation of 0.5 wt % to 5 wt %, preferably 1 wt % to 2 wt %, of addition of a multimer, preferably a dimer, capable of forming cross-links between polymer chains in the latex particle. Such a multimer is represented by ethylene glycol dimethacrylate, for example. As such, in one embodiment, the steric stabilized latex particulate can be cross-linked. These narrow ranges of cross-linking have been found beneficial to maintain the integrity of the latex under the high thermal shear conditions of thermal ink jetting while not adversely impacting its room temperature film-forming properties. Such cross-linking is helpful for latexes having glass transition temperatures below 50° C. Room temperature film-forming latexes generally require glass transition temperatures in the range of 0° C. to 50° C., preferably 10° C. to 40° C. Higher glass transition temperature ranges may be selected when latex coagulation is accomplished at a higher than ambient temperature, for example by heated fuser roller.

With these parameters in place regarding some of the possible steric stabilized latex particulates that can be formed, a discussion of dispersion fluids, e.g., inks, etc., is useful to exemplify how these latex particulates can be implemented for use in accordance with an embodiment of the present invention. Typically, inks include a colorant dispersed in a liquid vehicle. Typical liquid vehicle formulation that can be used with the latexes described herein can include water, and optionally, one or more co-solvents present in total at from 0.1 wt % to 50 wt %, depending on the jetting architecture. Further, one or more non-ionic, cationic, and/or anionic surfactant can be present, ranging from 0.01 wt % to 5.0 wt %. The balance of the formulation can be purified water, or other vehicle components known in the art, such as biocides, viscosity modifiers, materials for pH adjustment, sequestering agents, preservatives, and the like. Typically, the liquid vehicle is predominantly water.

Classes of co-solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. It is to be noted that the surfactant that is described as being usable in the liquid vehicle is not the same as the surfactant that is described as being adhered to the surface of the latex particulate, though many of the same surfactants can be used for either purpose.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept, Ucarcide, Vancide, Proxel, and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2.0 wt %, for example, can be used. Viscosity modifiers and buffers may also be present, as well as other additives known to those skilled in the art to modify properties of the ink as desired. Such additives can be present at from 0 wt % to 20.0 wt %.

In accordance with embodiments of the present invention, the steric stabilized latex particulates of the present invention can be present in an ink-jet ink at from about 0.5 wt % to about 15 wt %. In one embodiment, the steric stabilized latex particulates of the present invention can be present in an ink-jet ink at from about 2 wt % to about 4 wt %.

EXAMPLES

The following examples illustrate embodiments of the invention that are presently known. Thus, these examples should not be considered as limitations of the present invention, but are merely in place to teach how to make compositions of the present invention. As such, a representative number of compositions and their method of manufacture are disclosed herein.

Example 1

Preparation of a Steric Stabilized Latex Particulate

Methyl methacrylate (8 g), hexyl acrylate (8 g), and polyethylene oxide (M.W. 2000, 4 g) are mixed and emulsified in water (38 g) using the surfactant Rhodafac RS 710 (1.66 g of 30% solution). Ammonium cerium (IV) nitrate (1 g) is added and heated to 90° C. for 4 hours. The cerium compound with oxidation state of +4 is reduced to +2 while generating a radical on the polyethylene oxide randomly. This radical further reacts with the hydrophobic monomers (methyl methacrylate, hexyl acrylate) resulting in a steric stabilized latex particulate incorporating all three components, e.g., latex particulates including polymerized methyl methacrylate, hexyl acrylate, and oligomers of polyethylene oxide.

Example 2

Preparation of a Cross-linked Steric Stabilized Latex Particulate

Polyethylene oxide oligomer (2000 M.W., 4 g), butyl acrylate, (8 g), styrene (8 g), and ethylene glycol dimethacrylate (0.2 g) are mixed and emulsified in water (60 g) using a surfactant. Ammonium cerium (IV) nitrate (1 g) is added and heated to 90° C. for 4 hours. The cerium compound with oxidation state of +4 is reduced to +2 while generating a radical on the polyethylene oxide substituent of the oligomer randomly. This radical further reacts with the hydrophobic monomers (styrene, butyl acrylate and ethylene glycol dimethacrylate) and hydrophilic monomer (polyethylene oxide) resulting in a steric stabilized latex particulate incorporating all four components. During the polymerization, ethylene glycol dimethacrylate cross-links the developing steric stabilized latex particulate, e.g., latex particulates including polymerized butyl acrylate, styrene, and oligomers of polyethylene oxide.

Example 3

Preparation of an Ink Containing a Steric Stabilized Latex Particulate

An ink is prepared using the steric stabilized latex particulates of Example 1 as outlined in Table 1:

TABLE 1

| Component | Wt % |
|---|---|
| Latex of Example 1 or 2 | 0.1-10 |
| Propylene glycol monobutyl ether | 0.5-5 |
| Ethoxylated glycerol (LEG-1) | 0.5-15 |
| 2-pyrrolidinone | 0.5-15 |
| 2-ethyl-2-hydroxymethyl-1,3-propanediol (EHPD) | 0.5-15 |
| Surfactant | 0.001-10 |
| Pigment | 0.1-10 |
| Water | balance |

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. A steric stabilized latex particulate for use in an ink-jet ink, comprising a random cross-linked copolymer of a steric stabilization oligomer, cross-linker, and a hydrophobic monomer, wherein the cross-linker is present in the steric stabilized latex particulate from 1 wt % to 2 wt %.

2. The steric stabilized latex particulate of claim 1, wherein the hydrophobic monomer is selected from the group consisting of: styrene, p-methyl styrene, methyl methacrylate, hexyl acrylate, hexyl methacrylate, butyl acrylate, butyl methacrylate, ethyl acrylate, hydroxyethyl acrylate, ethyl methacrylate, hydroxyethyl methacrylate, propyl acrylate, hydroxypropyl acrylate, propyl methacrylate, hydroxypropyl methacrylate, vinylbenzyl chloride, ethylhexyl acrylate, ethylhexyl methacrylate, isobutyl acrylate, isobutyl methacrylate, cyclohexyl methacrylate, stearyl methacrylate, alpha-methylstyrene, vinyl acetate, vinyl benzoate, vinyl ethers such as vinyl methyl ether, vinyl phenyl ether, vinyl butyl ether, allyl ether, maleimide derivatives such as N-phenyl maleimide and N-methyl maleimide, and combinations thereof.

3. The steric stabilized latex particulate of claim 1, wherein the hydrophobic monomer is at least one of styrene, methyl methacrylate, butyl acrylate, butyl methacrylate, or hexyl methacrylate.

4. The steric stabilized latex particulate of claim 1, wherein the steric stabilization oligomer has from about 2 to 1000 monomer units.

5. The steric stabilized latex particulate of claim 1, wherein the steric stabilization oligomer has from about 2 to 100 monomer units.

6. The steric stabilized latex particulate of claim 1, wherein the steric stabilization oligomer has from about 10 to 50 monomer units.

7. The steric stabilized latex particulate of claim 1, wherein the steric stabilization oligomer is selected from the group consisting of: polymethylene oxide, substituted polymethylene oxide, polyethylene oxide, substituted polyethylene oxide, polypropylene oxide, substituted polypropylene oxide, acrylates thereof, and combinations thereof.

8. The steric stabilized latex particulate of claim 7, wherein the steric stabilization oligomer comprises a hydrophilic monomer or oligomer selected from the group consisting of: methoxy ethanol; methoxy ethoxy ethanol;
methoxy polyethylene glycol; polyethylene glycol; 1-methoxy-2-propanol; 3-methoxy-1,2-propanediol; poly(ethylene glycol-co-propylene glycol); polyethylene glycol with end groups of amino, acid, alkyl, or acrylate including further substitutions thereof; ethylene glycol monomethacrylate with ethylene oxide units from 1 to 100; and combinations thereof.

9. The steric stabilized latex particulate of claim 1, wherein the random copolymer further includes a second hydrophobic monomer copolymerized therewith, said second hydrophobic monomer selected from the group consisting of styrene, p-methyl styrene, methyl methacrylate, hexyl acrylate, hexyl methacrylate, butyl acrylate, butyl methacrylate, ethyl acrylate, hydroxyethyl acrylate, ethyl methacrylate, hydroxyethyl methacrylate, propyl acrylate, hydroxypropyl acrylate, propyl methacrylate, hydroxypropyl methacrylate, vinylbenzyl chloride, ethylhexyl acrylate, ethylhexyl methacrylate, isobutyl acrylate, isobutyl methacrylate, cyclohexyl methacrylate, stearyl methacrylate, alpha-methylstyrene, vinyl acetate, vinyl benzoate, vinyl ethers such as vinyl methyl ether, vinyl phenyl ether, vinyl butyl ether, allyl ether, maleimide derivatives such as N-phenyl maleimide and N-methyl maleimide, and combinations thereof.

10. The steric stabilized latex particulate of claim 9, wherein the second hydrophobic monomer is at least one of styrene, methyl methacrylate, butyl acrylate, butyl methacrylate, or hexyl methacrylate.

11. The steric stabilized latex particulate of claim 1, wherein the random copolymer further includes a hydrophilic monomer or hydrophilic oligomer copolymerized therewith.

12. The steric stabilized latex particulate of claim 11, wherein the hydrophilic monomer or hydrophilic oligomer is selected from the group consisting of:
ethylene oxide; propylene oxide; methylene oxide; methoxy ethanol; methoxy ethoxy ethanol; methoxy polyethylene glycol; polyethylene glycols; 1-methoxy-2-propanol; 3-methoxy-1,2-propanediol; poly(ethylene glycol-co-propylene glycol); polyethylene glycol with end groups of amino, acid, alkyl, or acrylate including further substitutions thereof; ethylene glycol monomethacrylate with ethylene oxide units from 1 to 100; and combinations thereof.

13. A method of forming the steric stabilized latex particulate of claim 1 for use in an ink-jet ink, comprising:
a) reacting a cerium initiator with a steric stabilized oligomer to form the steric stabilization oligomer wherein the oligomer is reactive, and
b) polymerizing a hydrophobic monomer and the steric stabilization oligomer in water to form the steric stabilized latex particulate.

14. The method of claim 13, wherein the steric stabilized latex particulate further comprises a surfactant.

15. The method of claim 13, wherein the step of polymerizing is by emulsion polymerization.

16. The method of claim 13, wherein the cerium initiator is selected from the group consisting of ammonium cerium (IV) nitrate, ammonium cerium (IV) sulfate, and combinations thereof.

17. The method of claim 13, wherein the cerium initiator initiates a free radical polymerization by forming a radical on a stabilization group of the steric stabilized oligomer forming the steric stabilization oligomer.

18. The method of claim 13, wherein the steric stabilization oligomer is selected from the group consisting of: polymethylene oxide, substituted polymethylene oxide, polyethylene oxide, substituted polyethylene oxide, polypropylene oxide, substituted polypropylene oxide, acrylates thereof, and combinations thereof.

19. The method of claim 13, further comprising the step of cross-linking the steric stabilized latex particulate.

20. The method of claim 13, wherein the step of polymerizing further comprises copolymerizing a second hydrophobic monomer therewith, said second hydrophobic monomer selected from the group consisting of: styrene, p-methyl styrene, methyl methacrylate, hexyl acrylate, hexyl methacrylate, butyl acrylate, butyl methacrylate, ethyl acrylate, hydroxyethyl acrylate, ethyl methacrylate, hydroxyethyl methacrylate, propyl acrylate, hydroxypropyl acrylate, propyl methacrylate, hydroxypropyl methacrylate, vinylbenzyl chloride, ethylhexyl acrylate, ethylhexyl methacrylate, isobutyl acrylate, isobutyl methacrylate, cyclohexyl methacrylate, stearyl methacrylate, alpha-methylstyrene, vinyl acetate, vinyl benzoate, vinyl ethers such as vinyl methyl ether, vinyl phenyl ether, vinyl butyl ether, allyl ether, maleimide derivatives such as N-phenyl maleimide and N-methyl maleimide, and combinations thereof.

21. The method of claim 13, wherein the step of polymerizing further comprises copolymerizing a hydrophilic monomer or hydrophilic oligomer therewith, said hydrophilic monomer or hydrophilic oligomer selected from the group consisting of: ethylene oxide; propylene oxide; methylene oxide; methoxy ethanol; methoxy ethoxy ethanol; methoxy polyethylene glycol of molecular weight 350, 550, 750, 1000, 2000 and 5000; polyethylene glycols of molecular weight from 100 to 10,000; 1-methoxy-2-propanol; 3-methoxy-1,2-propanediol; poly(ethylene glycol-co-propylene glycol) of molecular weight 100 to 5000; polyethylene glycol of molecular weight from 100 to 5,000 with end groups of amino, acid, alkyl, and acrylate including further substitutions thereof; ethylene glycol monomethacrylate with ethylene oxide units from 1 to 100; and combinations thereof.

22. The method of claim 13, wherein the hydrophobic monomer is selected from the group consisting of: styrene, p-methyl styrene, methyl methacrylate, hexyl acrylate, hexyl methacrylate, butyl acrylate, butyl methacrylate, ethyl acrylate, hydroxyethyl acrylate, ethyl methacrylate, hydroxyethyl methacrylate, propyl acrylate, hydroxypropyl acrylate, propyl methacrylate, hydroxypropyl methacrylate, vinylbenzyl chloride, ethylhexyl acrylate, ethylhexyl methacrylate, isobutyl acrylate, isobutyl methacrylate, cyclohexyl methacrylate, stearyl methacrylate, alpha-methylstyrene, vinyl acetate, vinyl benzoate, vinyl ethers such as vinyl methyl ether, vinyl phenyl ether, vinyl butyl ether, allyl ether, maleimide derivatives such as N-phenyl maleimide and N-methyl maleimide, and combinations thereof.

23. The method of claim 22, wherein the hydrophobic monomer is selected from the group styrene, methyl methacrylate, butyl acrylate, butyl methacrylate, and hexyl methacrylate.

24. An ink-jet ink, comprising:
a) a vehicle,
b) a colorant, and
c) the steric stabilized latex particulate of claim 1.

25. A method of ink-jet printing, comprising ink-jetting the ink-jet ink of claim 24.

* * * * *

UNITED STATES PATENT AND TRADEMARK OFFICE
CERTIFICATE OF CORRECTION

PATENT NO. : 8,314,163 B2  
APPLICATION NO. : 12/741546  
DATED : November 20, 2012  
INVENTOR(S) : Sivapackia Ganapathiappan Page 1 of 1

It is certified that error appears in the above-identified patent and that said Letters Patent is hereby corrected as shown below:

In column 8, line 67, in Claim 8, delete "amino, acid," and insert -- amino acid, --, therefor.

In column 9, line 7, in Claim 9, delete "of" and insert -- of: --, therefor.

In column 9, line 35, in Claim 12, delete "amino, acid," and insert -- amino acid, --, therefor.

In column 10, line 34, in Claim 21, delete "amino, acid," and insert -- amino acid, --, therefor.

Signed and Sealed this
Second Day of April, 2013

Teresa Stanek Rea
*Acting Director of the United States Patent and Trademark Office*